Feb. 25, 1969 M. POSTORINO 3,429,024
METHOD FOR MANUFACTURING SOLDERING IRON TIPS
Filed June 20, 1966
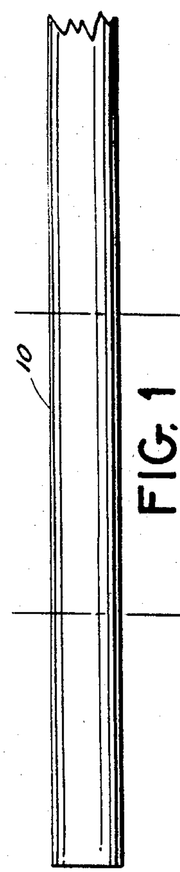
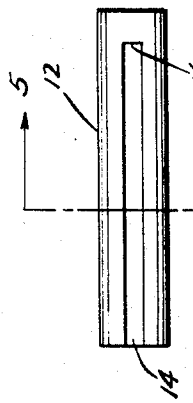
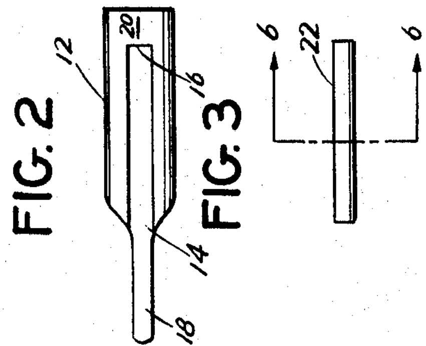
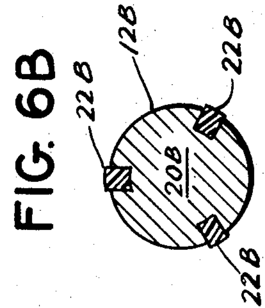
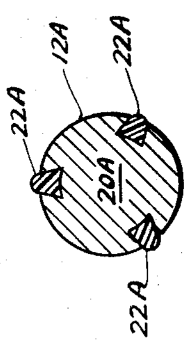
INVENTOR.
MARIO POSTORINO
BY
Constantine A. Michalos
ATTORNEY 3,429,024
Patented Feb. 25, 1969

3,429,024

METHOD FOR MANUFACTURING SOLDERING IRON TIPS

Mario Postorino, Newark, N.J., assignor to Gennaro Scamberti, Jr., Newark, N.J.

Filed June 20, 1966, Ser. No. 558,783
U.S. Cl. 29—417 9 Claims
Int. Cl. B23p *17/00, 19/02;* B23k *3/02*

This invention relates to a method for manufacturing removable tips for soldering irons and, more particularly, to a method for manufacturing a soldering iron tip which reduces the likelihood of the tip seizing in the heating element of the soldering iron.

It is well known in the art that the useful life of a soldering iron tip of copper or some other metal of high heat conductivity is shortened, and the removal of the tip from the heating element of the soldering iron hindered, when the tip oxidizes and the formation of scale causes the tip to seize in the heating element.

One object of this invention is to provide a novel method for manufacturing a soldering iron tip which avoids the disadvantages of soldering iron tips of the type referred to above.

Another object of this invention is to provide a method for manufacturing a soldering iron tip so that the tip includes a plurality of surfaces having better wearing characteristics than that of the body metal of the tip, with said surfaces for contacting the heating element of the soldering iron when the tip is inserted therein.

The foregoing and other objects and advantages of the invention will appear more fully hereinafter from a consideration of the detailed description which follows taken together with the accompanying drawings wherein several embodiments of the invention are illustrated by way of example. It is to be expressly understood, however, that the drawings are for illustration purposes only and are not to be construed as defining the limits of the invention.

*In the drawings*

FIGURES 1 to 4 inclusive are side elevation views which respectively illustrate steps included in the method of the present invention.

FIGURES 5A and 5B are sectional end views taken along line 5—5 in FIGURE 2 and illustrate, respectively, two embodiments of the step of the invention illustrated by FIGURE 2.

FIGURES 6A and 6B are section end views taken along line 6—6 in FIGURE 4 and illustrate, respectively, two embodiments of the step of the invention illustrated by FIGURE 4.

FIGURES 7 and 8 are sectional end views illustrating finished soldering iron tips in accordance with the embodiments of the steps of the invention illustrated by FIGURES 5A and 6A and 5B and 6B, respectively.

In the method for manufacturing soldering iron tips in accordance with the present invention, a rod 10 of copper or some other suitable heat conducting metal is provided. The rod 10 may be of a suitable diameter and of an undeterminable length, and is cut into sections of suitable length substantially corresponding to the desired lengths of the finished soldering iron tips. This step in the novel method of the present invention is illustrated in FIGURE 1, wherein the points of cutting are indicated by transverse broken lines.

A cut length of copper rod designated by the numeral 12 in FIGURE 2, and provided by the cutting step illustrated in FIGURE 1, is grooved so as to provide a plurality of grooves around the circumference of the rod length 12, with one such groove being shown in FIGURE 2 and designated by the numeral 14. The groove 14 terminates at a shoulder 16, with the shoulder 16 having a purpose which will be hereinafter explained. The grooving required in this step of the novel method of the subject invention may be accomplished by an automatic screw machine or other similar apparatus well known in the art.

One embodiment of the grooving step illustrated by FIGURE 2 is best illustrated by reference to FIGURE 5A, wherein three grooves substantially trapezoidal in section and designated as the grooves 14A are shown spaced equidistant around the circumference of a rod length 12A. The size of the grooves 14A may be predetermined in accordance with a further step of the novel method of the present invention to be hereinafter described.

Another embodiment of the aforenoted grooving step is best illustrated by reference to FIGURE 5B, wherein three grooves substantially rectangular in cross-section and designated as the grooves 14B are shown spaced equidistant around the circumference of a rod length 12B.

In the step of the invention as illustrated by FIGURE 2, and the embodiments thereof as illustrated by FIGURES 5A and 5B, grooves of trapezoidal and rectangular cross-section, respectively, have been illustrated, but not by way of limitation, since any other groove cross-section which will satisfy the purposes of the present invention as to be hereinafter exemplified may be used as well.

The rod length 12, grooved as heretofore noted, may next be machined so as to shape the extremity thereof into a working configuration. This step of the novel method of the subject invention is illustrated by FIGURE 3, wherein the rod length is shown as having a working tip 18 so as to provide a tip body 20. It will now be obvious to those skilled in the art that for purposes of manufacturing expediency the grooving step illustrated by FIGURE 2, and the shaping step illustrated by FIGURE 3, may be combined into a single step, wherein the grooving and the shaping are simultaneously accomplished by an automatic screw machine or other similar apparatus in order to provide the tip body 20.

There is next provided an insert such as the insert 22 illustrated in FIGURE 4. The insert 22 is of a length substantially corresponding to the length of the groove 14 shown in FIGURE 3, and may have a trapezoidal cross-section as shown in FIGURE 6A wherein the insert is designated as 22A, or rectangular cross-section as shown in FIGURE 6B wherein the insert is designated as 22B. The insert 22 is of a material possessing better wearing characteristics than that of the copper base metal tip body 20, and has a high resistance to oxidation or other forms of corrosion. Although a variety of materials have the aforenoted characteristics, those which have been found suitable for the purposes intended in the method of the present invention include the following: commercial lava having properties as outlined in Handbook of Engineering Fundamentals, Eshback, John Wiley and Sons, Inc., 1936, pages 12–59, 12–60; a carbon material such as that described in Handbook of Engineering Fundamentals, supra, pages 11–99, 11–100; and a wear resistant, self-lubricating polyflourcarbon material such as Teflon.

The insert 22A of trapezoidal cross-section as shown in FIGURE 6A, corresponds in size to the groove 14A so as to permit a light press fit between the insert 22A and the groove 14A. Similarly, the insert 22B of rectangular cross-section as shown in FIGURE 22B corresponds in size to the groove 14B so as to permit a light press fit between the insert 22B and the groove 14B. It should be noted that the aforenoted grooves 14A and 14B may be of a predetermined size so as to permit the use of commercially available stock of trapezoidal and rectangular cross-section for the inserts 22A and 22B, respectively, so that no further shaping or sizing of the inserts 22A and 22B is required, or in the alternative, conventional stock of circular or rectangular cross-section may be used and subsequently machined or otherwise finished so as to provide the inserts 22A and 22B of the correct size for a light press fit with the aforenoted grooves 14A and 14B.

An insert 22 is next inserted in each of the grooves 14 of the tip body 20. The inserting step may be accomplished by manual or automatic means well known in the art, and by employing suitable tooling wherein the inserts 22 may be individually or simultaneously inserted in the grooves 14, said tooling being outside of the scope of the present invention. It should be noted, however, that generally the insert 22 is inserted in the groove 14 from the end of the tip body 20 whereat the working tip 18 is located. The insert 22 may then be urged along the length of the groove 14 until it becomes contiguous with the shoulder 16 of the groove 14. The shoulder 16 thus acts as a positive stop for the insert 22 and functions as an aid in the inserting step of the method of the present invention to indicate when the insert 22 has been fully inserted in the groove 14.

Upon completion of the inserting step there is provided a finished soldering iron tip such as that illustrated by FIGURE 7, or that illustrated by FIGURE 8. The inserts 22A and 22B, shown in FIGURES 7 and 8, respectively, extend above the surfaces of the tip bodies 20A and 20B so that when the finished soldering iron tip is inserted in the heating element of a soldering iron, the inserts 22A or the inserts 22B provide a plurality of wear and corrosion resistant surfaces for contacting the heating element of the soldering iron. The oxidizing rate of the finished soldering iron tip is thus reduced and the life of the finished soldering iron tip is increased. The removal of the finished soldering iron tip from the heating element of the soldering iron is facilitated since the possibility of the inserts 22A or 22B becoming seized in the heating element of the soldering iron is reduced.

The novel method of the present invention for manufacturing removable soldering iron tips has been described herein with reference to a series of sequential steps. It will be obvious to those skilled in the art, however, that for the purposes of manufacturing expediency several of the aforenoted steps may be omitted, several steps may be combined, and still other steps may be added while still preserving the objects and intent of the invention. For example, the cutting step of the novel method of the present invention, as illustrated by FIGURE 1, may be omitted by providing commercially available pre-cut rods corresponding to the rod length 12. Also, the rod length 12 may be provided wherein the grooves 14 are pre-cut or pre-cast therein so as to eliminate the grooving step illustrated by FIGURE 2, or to include the grooving step for merely finishing the pre-cast or pre-cut grooves 14 for the desired press fit with the inserts 22. In another variation of the novel method, the tip body 20 may be provided pre-shaped at one end thereof to the working tip 18, whereby the shaping step as illustrated by FIGURE 3 may be eliminated.

While the description herein of the novel method of the present invention pre-supposes, for purposes of illustration, that the inserts 22 are pre-finished so that upon insertion in the tip body 20, appropriate surfaces for contacting the heating element of the soldering iron are provided, further machining steps are within the scope of the present invention. For example, contouring of the inserts 22 after insertion in the tip body 20 may be desired to provide proper contacting surfaces for the heating element of the soldering iron. Also, machining of the inserts 22 after insertion in the tip body 20 to insure that the inserts 22 extend the proper amount above the surface of the rod length 12 may be preferable and desirable.

Although several embodiments of the invention have been illustrated and described in detail, it is to be expressly understood that the invention is not limited thereto. Various changes in the arrangement of the steps may also be made without departing from the spirit and scope of the invention as the same will now be understood by those skilled in the art.

What is claimed is:

1. A method for manufacturing a removable soldering iron tip, comprising the steps of:

cutting a rod of a heat conducting material for providing a rod length corresponding to the length of the soldering iron tip;

grooving the rod length for providing a plurality of grooves around the circumference of the rod length and extending longitudinally therealong;

shaping the rod length for providing a working tip at one end thereof and for providing a soldering iron tip body;

providing inserts of a wear resistant material and corresponding to the grooves in the tip body; and inserting the inserts into the grooves so that the inserts extend above the surface of the tip body for providing a finished soldering iron tip having a plurality of wear resistant surfaces for contacting the heating element of the soldering iron.

2. A method as described by claim 1, including the additional step of:

machining the finished soldering iron tip for contouring and sizing the inserts extending above the tip body.

3. A method as described by claim 1, wherein:

the grooving and shaping steps are performed in the same operation for providing the soldering iron tip body.

4. A method as described by claim 1 wherein the grooving step includes:

terminating the grooves for providing shoulders at the end of the tip body opposite to the end thereof having the working tip.

5. A method as described by claim 4, wherein the inserting step includes the steps of:

inserting the inserts into the grooves from the end of the tip body having the working tip; and urging the inserts along the length of the grooves until the inserts are contiguous with the shoulders provided by terminating the grooves.

6. A method as described by claim 1 wherein the step of providing inserts corresponding to the grooves in the tip body includes the step of:

machining the inserts for providing a light press fit with the grooves.

7. A method as described by claim 1 wherein the rod length is pre-grooved and the grooving step includes:

machining the grooves to a predetermined size and shape.

8. A method as described by claim 1, wherein the grooving step includes:

providing at least three grooves spaced equidistant around the circumference of the rod length.

9. A method as described by claim 1, wherein:

the shaping step is performed prior to the grooving step.

(References on following page)

References Cited

UNITED STATES PATENTS

| | | | |
|---|---|---|---|
| 748,571 | 1/1904 | Ayer | 219—238 |
| 1,686,328 | 10/1928 | Kalmar et al. | 219—238 |
| 2,448,182 | 8/1948 | Kalfen | 219—238 X |
| 2,592,426 | 4/1952 | Jeffrey | 219—238 |
| 2,916,226 | 12/1959 | McGraw. | |
| 3,105,331 | 10/1963 | Reardon et al. | |
| 3,109,231 | 11/1963 | Johnson | 29—417 X |
| 3,220,096 | 11/1965 | Schraub | 29—445 X |

FOREIGN PATENTS

| | | |
|---|---|---|
| 239,233 | 11/1926 | Great Britain. |

CHARLIE T. MOON, *Primary Examiner.*

U.S. Cl. X.R.

29—445, 149.5, 525, 451; 219—238; 228—55; 308—4